US005807510A

United States Patent [19]

Furuse et al.

[11] Patent Number: 5,807,510

[45] Date of Patent: Sep. 15, 1998

[54] ELECTRIC RESISTANCE ELEMENT EXHIBITING VOLTAGE NONLINEARITY CHARACTERISTIC AND METHOD OF MANUFACTURING THE SAME

[75] Inventors: Naomi Furuse; Masahiro Kobayashi; Toshihiro Suzuki; Junichi Shimizu; Yoshio Takada; Hiroshi Nakajoh; Kei-Ichiro Kobayashi; Tomoaki Kato, all of Tokyo, Japan

[73] Assignee: Mitsubishi Denki Kabushiki Kaisha, Tokyo, Japan

[21] Appl. No.: 682,310

[22] Filed: Jul. 17, 1996

[30] Foreign Application Priority Data

Sep. 7, 1995 [JP] Japan .................................... 7-230169

[51] Int. Cl.$^{6}$ .............................. H01B 1/08; H01C 7/10; B28B 1/00; C04B 35/453

[52] U.S. Cl. ................................ 252/519.51; 252/519.52; 252/519.54; 338/21; 264/617

[58] Field of Search .................................... 252/518, 519, 252/521, 519.51, 519.52, 519.54, 521.1, 521.3, 521.4; 338/13, 20, 21; 264/617

[56] References Cited

U.S. PATENT DOCUMENTS

| | | | |
|---|---|---|---|
| 4,160,748 | 7/1979 | Yodogawa et al. | 252/518 |
| 4,169,071 | 9/1979 | Eda et al. | 252/517 |
| 4,477,793 | 10/1984 | Mukae et al. | 338/21 |
| 5,107,242 | 4/1992 | Imai et al. | 338/21 |
| 5,277,843 | 1/1994 | Imai et al. | 252/518 |

FOREIGN PATENT DOCUMENTS

| | | |
|---|---|---|
| 0 200 126 | 11/1986 | European Pat. Off. . |
| 0 322 211 | 6/1989 | European Pat. Off. . |
| 0 357 113 | 3/1990 | European Pat. Off. . |
| 0 594 120 A2 | 4/1994 | European Pat. Off. . |
| 0 617 436 A1 | 9/1994 | European Pat. Off. . |
| 33 23 579 | 1/1984 | Germany . |
| 63-16601 | 1/1988 | Japan . |
| 05 074606 | 3/1993 | Japan . |
| 06 321617 | 11/1994 | Japan . |
| 7-201531 | 8/1995 | Japan . |
| 7-201532 | 8/1995 | Japan . |

OTHER PUBLICATIONS

Mahan, G.D. et al., *Theory of conduction in ZnO varistors, Journal of Applied Phsyics*, vol. 50(4), Apr. 1979, pp. 2799–2812.

*Primary Examiner*—Mark Kopec
*Attorney, Agent, or Firm*—Burns, Doane, Swecker & Mathis, LLP

[57] ABSTRACT

A composition for electric material containing as a primary component zinc oxide. The composition further contains at least one of rare-earth elements in a range of 0.01 mol % to 3.0 mol % in terms of oxide thereof given by $R_2O_3$ where R represents generally the rare-earth elements, and aluminum in a range of 0.0005 mol % to 0.005 mol % in terms of aluminum oxide given by $Al_2O_3$. The composition is suited for manufacturing a resistance element whose varistor voltage can be increased over a whole current range without being accompanied with any appreciable degradation in flatness ratio of a voltage-versus-current characteristic.

7 Claims, 9 Drawing Sheets

FIG. 1

| FIRING PATTERN No. | FIRST FIRING STEP (1150°C x 5h) | | | SECOND FIRING STEP | | | | | |
|---|---|---|---|---|---|---|---|---|---|
| | ATMOS PHERE | Va (°C/hr) | Vb (°C/hr) | ATMOS PHERE | Vc (°C/hr) | Ta(°C) | Vd (°C/hr) | Tb(°C) | Ve (°C/hr) |
| 1 | IN THE AIR | 30 | 50 | 100% OXYGEN | 100 | 1100x5h | 50 | 750 | 20 |
| 2 | " | 15 | " | " | " | " | " | " | " |
| 3 | " | 30 | 10 | " | " | " | " | " | " |
| 4 | " | " | 100 | " | " | " | " | " | " |
| 5 | " | " | 50 | " | 50 | " | " | " | " |
| 6 | " | " | " | " | 200 | " | " | " | " |
| 7 | " | " | " | " | 100 | " | 100 | " | " |
| 8 | " | " | " | " | " | " | 50 | 800 | " |
| 9 | " | " | " | " | " | " | " | 750 | 50 |
| 10 | " | 60 | " | " | " | " | " | " | 20 |
| 11 | " | 30 | " | " | " | 900x5h | " | " | " |
| 12 | " | " | " | " | " | 1300x5h | " | " | " |
| 13 | " | " | " | " | " | 1100x5h | 200 | " | " |
| 14 | " | " | " | " | " | " | 50 | 450 | " |
| 15 | " | " | " | " | " | " | " | 850 | " |
| 16 | " | " | " | " | " | " | " | 750 | 100 |

(NOTE: "〃" MEANS "DITTO")

FIG. 4

| SPECIMEN | CONTENT OF $AL_2O_3$ (mol%) | CONTENT OF OXIDE OF RARE-EARTH ELEMENT (mol%) | FIRING PATTERN No. | VARISTOR VOLTAGE | FLATNESS RATIO IN LARGE CURRENT REGION | FLATNESS RATIO IN SMALL CURRENT REGION |
|---|---|---|---|---|---|---|
| 17 | 0. 002 | 0 | 1 | 236 | 1. 50 | 1. 32 |
| 18 | " | 0. 001 | " | 265 | 1. 69 | 1. 24 |
| 19 | " | 0. 01 | " | 360 | 1. 67 | 1. 26 |
| 20 | " | 0.1 | " | 392 | 1. 65 | 1. 28 |
| 21 | " | 3 | " | 489 | 1. 61 | 1. 34 |
| 22 | " | 5 | " | 502 | 1. 57 | 1. 48 |
| 23 | 0. 0001 | 0.1 | " | 449 | 1. 85 | 1. 12 |
| 24 | 0. 0005 | " | " | 432 | 1. 75 | 1. 18 |
| 25 | 0. 001 | " | " | 417 | 1. 67 | 1. 26 |
| 26 | 0. 005 | " | " | 393 | 1. 64 | 1. 37 |
| 27 | 0. 01 | " | " | 386 | 1. 61 | 1. 47 |

FIG. 6

| SPECIMEN | FIRING PATTERN No. | VARISTOR VOLTAGE | FLATNESS RATIO IN LARGE CURRENT REGION | FLATNESS RATIO IN SMALL CURRENT REGION |
|---|---|---|---|---|
| 28 | 1 | 442 | 1. 63 | 1. 30 |
| 29 | 2 | 445 | 1. 66 | 1. 29 |
| 30 | 3 | 441 | 1. 64 | 1. 30 |
| 31 | 4 | 438 | 1. 62 | 1. 33 |
| 32 | 5 | 439 | 1. 65 | 1. 32 |
| 33 | 6 | 440 | 1. 66 | 1. 31 |
| 34 | 7 | 430 | 1. 60 | 1. 34 |
| 35 | 8 | 426 | 1. 63 | 1. 35 |
| 36 | 9 | 417 | 1. 65 | 1. 53 |
| 37 | 10 | 440 | 1. 65 | 1. 30 |
| 38 | 11 | 405 | 1. 64 | 2. 04 |
| 39 | 12 | 453 | 1. 63 | 1. 21 |
| 40 | 13 | 421 | 1. 60 | 1. 38 |
| 41 | 14 | 425 | 1. 63 | 1. 47 |
| 42 | 15 | 433 | 1. 61 | 1. 35 |
| 43 | 16 | 411 | 1. 62 | 1. 72 |

FIG. 7

| SPECIMEN | CONTENT OF $AL_2O_3$ (mol%) | CONTENT OF OXIDE OF RARE-EARTH ELEMENT (mol%) | FIRING PATTERN No. | OXYGEN CONCENT RATION (%) | VARISTOR VOLTAGE | FLATNESS RATIO |
|---|---|---|---|---|---|---|
| 44 | 0. 002 | 0. 01 | 1 | 100 | 384 | 2. 09 |
| 45 | ,, | 0. 1 | ,, | ,, | 403 | 2. 12 |
| 46 | ,, | 3 | ,, | ,, | 492 | 2. 11 |
| 47 | 0. 0005 | 0. 1 | ,, | ,, | 432 | 2. 14 |
| 48 | 0. 005 | ,, | ,, | ,, | 382 | 2. 13 |
| 49 | 0. 002 | 0. 01 | ,, | 80 | 386 | 2. 13 |
| 50 | ,, | 0. 1 | ,, | ,, | 407 | 2. 13 |
| 51 | ,, | 3 | ,, | ,, | 490 | 2. 15 |
| 52 | 0. 0005 | 0. 1 | ,, | ,, | 437 | 2. 18 |
| 53 | 0. 005 | ,, | ,, | ,, | 379 | 2. 17 |
| 54 | 0. 002 | 0. 01 | ,, | 60 | 381 | 2. 19 |
| 55 | ,, | 0. 1 | ,, | ,, | 405 | 2. 22 |
| 56 | ,, | 3 | ,, | ,, | 495 | 2. 23 |
| 57 | 0. 0005 | 0. 1 | ,, | ,, | 433 | 2. 25 |
| 58 | 0. 005 | ,, | ,, | ,, | 381 | 2. 26 |

FIG. 8

| FIRING PATTERN No. | OXYGEN CONCENTRATION OF FIRING ATMOSPHERE (%) | Ta (°C) | Tb (°C) | OXYGEN CONCENTRATION IN TEMP. RANGE FROM Ta TO Tb (%) | Vd (°C/h) | Ve (°C/h) |
|---|---|---|---|---|---|---|
| 17 | 100 | 1100 | 500~800 | 100 | 50 | 5 |
| 18 | " | 1100 | 500~800 | 80 | 50 | 5 |
| 19 | " | 1100 | 500~800 | 50 | 50 | 5 |
| 20 | " | 1100 | 500~800 | 30 | 50 | 5 |
| 21 | " | 1100 | 500~800 | 0 | 50 | 5 |
| 22 | 80 | 1100 | 500~800 | 100 | 50 | 5 |
| 23 | " | 1100 | 500~800 | 80 | 50 | 5 |
| 24 | " | 1100 | 500~800 | 50 | 50 | 5 |
| 25 | " | 1100 | 500~800 | 30 | 50 | 5 |
| 26 | " | 1100 | 500~800 | 0 | 50 | 5 |
| 27 | 30 | 1100 | 500~800 | 100 | 50 | 5 |
| 28 | " | 1100 | 500~800 | 80 | 50 | 5 |
| 29 | " | 1100 | 500~800 | 50 | 50 | 5 |
| 30 | " | 1100 | 500~800 | 30 | 50 | 5 |
| 31 | " | 1100 | 500~800 | 0 | 50 | 5 |

FIG. 9

| SPECIMEN | FIRING PATTERN No. | VARISTOR VOLTAGE | FLATNESS RATIO IN LARGE CURRENT REGION | FLATNESS RATIO IN SMALL CURRENT REGION |
|---|---|---|---|---|
| 59 | 17 | 395 | 1. 65 | 1. 28 |
| 60 | 18 | 389 | 1. 64 | 1. 26 |
| 61 | 19 | 388 | 1. 63 | 1. 27 |
| 62 | 20 | 390 | 1. 61 | 1. 27 |
| 63 | 21 | 401 | 1. 58 | 1. 28 |
| 64 | 22 | 393 | 1. 66 | 1. 27 |
| 65 | 23 | 398 | 1. 64 | 1. 26 |
| 66 | 24 | 405 | 1. 62 | 1. 25 |
| 67 | 25 | 396 | 1. 61 | 1. 27 |
| 68 | 26 | 394 | 1. 60 | 1. 25 |
| 69 | 27 | 399 | 1. 67 | 1. 28 |
| 70 | 28 | 408 | 1. 65 | 1. 26 |
| 71 | 29 | 411 | 1. 64 | 1. 26 |
| 72 | 30 | 407 | 1. 62 | 1. 27 |
| 73 | 31 | 416 | 1. 59 | 1. 25 |

ELECTRIC RESISTANCE ELEMENT EXHIBITING VOLTAGE NONLINEARITY CHARACTERISTIC AND METHOD OF MANUFACTURING THE SAME

BACKGROUND OF THE INVENTION

1. Field of the Invention

The present invention relates to an electric resistance element which is made of a sintered material containing zinc oxide as a primary component and which exhibits a nonlinear voltage characteristic (also referred to as the voltage nonlinearity characteristic or simply as voltage nonlinearity). The invention is also concerned with composition of the electric resistance element mentioned above and a method of manufacturing the same.

2. Description of Related Art

Heretofore, it is well known in the art that a sintered material containing zinc oxide as a primary component and added with bismuth oxide, cobalt oxide and/or other oxides exhibits a nonlinear voltage characteristic or voltage nonlinearity. The resistance element formed of such sintered material is widely employed in practical applications, as typified by a surge absorber for protecting circuit elements by absorbing a surge current (steep current rise), an arrester for protecting electric/electronic apparatuses or equipment against an abnormal voltage brought about by lightning and others.

For having better understanding of the present invention, description will first be directed to the background techniques of the invention in some detail. FIG. 10 is a schematic diagram showing a structure of a typical one of the sintered materials known heretofore from which the nonlinear voltage resistance element is made. Referring to the figure, some of spinel grains 1 each consisting of antimony compound and having a grain size in a range of one to several microns exist within zinc oxide grains while the other spinel grains 1 exist internally of or adjacent to inter-grain boundary regions which contain bithmus oxide 3 as a primary component existing in the vicinity of triple points (multiple points) of zinc oxide grains. It is observed that some of bismuth oxide grains 3 not only exist at the multiple points but also penetrate deeply between the zinc oxide grains 2. Parenthetically, reference numeral 4 in FIG. 10 denotes a twin crystal boundary.

It has experimentally been established by a measurement conducted by using point electrodes that the grain containing primarily zinc oxide acts by itself simply as electric resistor while the boundary regions between the zinc oxide grains 2 exhibit voltage nonlinearity (see G. D. Mahan; L. M. Levinson and H. R. Phillip: "THEORY OF CONDUCTION IN ZnO VARISTORS", J. Appl. Phys. 50(4)2799 (1979)). Furthermore, it has also experimentally been demonstrated that the number of boundaries between the zinc oxide grains 2 (also referred to as the inter-grain boundaries) determines a varistor voltage.

The sintered material having such fine or microscopic structure as mentioned above and containing zinc oxide as the primary component usually exhibits such a voltage-versus-current characteristic (hereinafter also referred to as the V-I characteristic) as illustrated in FIG. 11. This V-I curve may be divided into three sections or regions in view of physical mechanisms mentioned below.

(1) A region in which a leakage current remains small when compared with an applied voltage due to a current limiting function of a Schottoky barrier presented by the grain boundaries (a region including a point L shown in FIG. 11) in which the typical current value on the order of 10 $\mu$A is ordinarily selected for the resistance element having a diameter of about 100 mm).

(2) A region in which resistance value decreases steeply as the applied voltage is increased, which causes a tunnel current flowing through the grain boundaries to increase for thereby decreasing steeply the resistance for the voltage as applied (i.e., a region including a transition point S shown in FIG. 11 at which transition or changing point from the region (1) to the region (2) occurs) and in which a current of a value typically in a range of 1 to 3 mA is generally selected for a resistance element having a diameter $\phi$ of about 100 mm.

(3) A (V-I) region which is determined by the electric resistance of zinc oxide grains themselves (a region covering a point H shown in FIG. 11 in which a current value typically of 10 kA is generally selected for the resistance element having a diameter on the order of 100 mm $\phi$).

In the case of a sintered material containing zinc oxide grains which material is an n-type semiconductor material, it is observed that when oxygen adheres or exists in excess in the crystal grain boundaries, an electron capturing level is formed at the interfaces, as a result of which depletion layers in which no electron exists are formed along the grain interfaces, forming eventually generating the electron barriers (i.e., Schottoky barriers) at or along the grain boundaries. Consequently, as the barrier height or level of the Schottoky barriers increases, the leakage current decreases. Thus, there can be obtained an electric resistance element which is excellent in respect to flatness of the V-I characteristic curve in the small-current region.

In this conjunction, it is noted that the electric characteristic at the grain boundary exerts a great influence to the flatness of the V-I characteristic curve in the small-current region, while resistance of the zinc oxide grains themselves affects remarkably the flatness of the V-I characteristic curve in a large-current region. More specifically, because increasing in the electric resistance of zinc oxide grains degrades the flatness of the V-I characteristic curve in the aforementioned region, it is preferred that the electric resistance of the zinc oxide grains should be as low as possible.

Now, for convenience of description, a phrase "flatness ratio" used herein will be defined. A ratio between a voltage $V_H$ in the large-current region H shown in FIG. 11 and a voltage $V_L$ in the small-current region L, i.e., $V_H/V_L$, is defined as the flatness ratio, as can be seen in FIG. 11. Furthermore, a ratio between the varistor voltage $V_S$ and the voltage $V_L$ in the small current region, i.e., $V_S/V_L$, is referred to as the flatness ratio in the small-current region, while a ratio between the varistor voltage $V_S$ and the voltage $V_H$ in the large-current region, i.e., the ratio $V_H/V_S$, is referred to as the flatness ratio in the large-current region.

In the case of the resistance element exhibiting the nonlinear voltage characteristic, the varistor voltage $V_S$ shown in FIG. 11 represents a threshold voltage. In this conjunction, it is important to set the varistor voltage $V_S$ in dependence on a voltage of a power transmission system or line to which an arrester constituted by the resistance element having the nonlinear voltage characteristic is to be actually applied. Parenthetically, in many practical cases, the varistor voltage $V_S$ is typically represented by an inter-electrode voltage (or terminal voltage) appearing across the resistance element upon flowing of a current of 1 mA therethrough. This terminal voltage which will hereinafter be represented by $V_{1mA}$ is in proportion to a thickness of the resistance element.

In recent years, there arises a great demand for an arrester of higher performance for the purpose of protecting various apparatuses and instruments employed in power transmission systems in which electric power transmission tends to be realized with higher and higher voltage. In order to satisfy such demand, it becomes necessary to obtain such a resistance element which is capable of exhibiting excellent nonlinear voltage characteristic such as, for example, a resistance element having a smaller flatness ratio which plays an important role in realizing desired characteristics of the arrester.

In this connection, in order to reduce the flatness ratio, there is required a manufacturing technique which is capable of increasing the barrier height of the Schottoky barriers existing in the grain boundaries between the zinc oxide grains. However, the attempt for improving the flatness ratio in the large-current region will usually be accompanied with degradation of the flatness ratio in the small-current region. On the other hand, approach for improving the flatness ratio in the small-current region will involve degradation of the flatness ratio in the large-current region.

On the other hand, in the case of the arrester which is used in an ultra-high voltage power transmission system rated, for example, on the order of 100 million volts, a number of elements having a substantially same geometrical configuration and the varistor voltage value $V_S$ equivalent to that of the resistance elements known heretofore are stacked with the individual elements being electrically connected in series to one another. In that case, the number of the electrical resistance elements as stacked necessarily tends to increase, involving not only a bulky or large structure of the arrester as a whole but also complication in the techniques required for realizing the serial connection, thus giving rise to many problems in respect to the arrester designs not only from the electrical view point but also from the thermal as well as mechanical standpoint. Such being the circumstances, it is believed that if the electrical resistance elements each capable of exhibiting a high varistor voltage $V_S$ per unit length (e.g. 1 mm) are available, the problems mentioned above can be solved, because then the voltage to be born by each of the electrical resistance elements can be increased, which in turn allows the number of the resistance elements stacked for realizing the series connection to be decreased.

In summarization, it can be said that in the case of the electrical resistance element exhibiting the voltage nonlinearity as well as the method of manufacturing the same, the flatness ratio is often degraded when the varistor voltage is increased by varying the composition of the electrical resistance material by changing correspondingly the ratios or proportions of the additives. In particular, in the case of the resistance elements destined for application to a high or ultra-high power transmission system, a large leakage current tends to be generated upon application of a high voltage. Thus, there is encountered a great difficulty in realizing compatibility between increasing of the varistor voltage and the flatness ratio in the small-current region which is a very important factor, as mentioned hereinbefore.

SUMMARY OF THE INVENTION

In the light of the state of the art described above, it is an object of the present invention to provide a electrical resistance element exhibiting a nonlinear voltage characteristic which element can evade or mitigate the problems mentioned above.

Another object of the present invention is to provide a method of manufacturing the electrical resistance element mentioned above.

In view of the above and other objects which will become apparent as the description proceeds, there is provided according to an aspect of the present invention an electric resistance element exhibiting a nonlinear voltage characteristic, which element contains as a primary component zinc oxide and additionally contains bismuth oxide, antimony oxide, chromium oxide, nickel oxide, cobalt oxide, manganese oxide, silicon oxide and boron oxide. The resistance element further contains at least one of rare-earth elements in a range of 0.01 mol % to 3.0 mol % in terms of oxide thereof given by $R_2O_3$ where R represents generally the rare-earth elements, and aluminum in a range of 0.0005 mol % to 0.005 mol % in terms of aluminum oxide given by $Al_2O_3$.

In a preferred mode for carrying out the invention, the rare-earth elements may include yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu).

With the above-mentioned composition of the resistance element of voltage nonlinearity, the varistor voltage can be increased over the whole current range from small to large current levels without being accompanied with any appreciable degradation in the flatness ratio of the V-I characteristic curve.

Furthermore, according to another aspect of the present invention, there is provided a method of manufacturing an electric resistance element exhibiting a nonlinear voltage characteristic, starting from a mixture containing as a primary component zinc oxide and additionally bismuth oxide, antimony oxide, chromium oxide, nickel oxide, cobalt oxide, manganese oxide, silicon oxide and boron oxide, and further containing at least one of rare-earth elements in a range of 0.01 mol % to 3.0 mol % in terms of oxide thereof given by $R_2O_3$ where R represents generally the rare-earth elements, and aluminum in a range of 0.0005 mol % to 0.005 mol % in terms of aluminum oxide given by $Al_2O_3$. The method includes a step of preparing the mixture and forming a preform of a predetermined shape, a first firing step of firing the preform in the atmosphere of air by rising a firing temperature from 500° C. to a maximum temperature of a value in a range of 1000° to 1300° C. at a temperature rising rate lower than 30° C./hr inclusive, a second firing step carried out in succession to the first firing step for firing the preform in an oxidizing atmosphere, wherein a maximum firing temperature in the second firing step is set at a value falling within a range from 950° C. to the maximum firing temperature in the first firing step, and a step of lowering the firing temperature in the second firing step at a temperature-lowering rate which is changed from a higher temperature-lowering rate to a lower temperature-lowering rate at a predetermined point of changing of the temperature lowering, wherein the higher temperature-lowering rate lies within a range of 50° to 200° C./hr while the lower temperature-lowering rate is smaller than 50° C./hr inclusive, and wherein the predetermined temperature lowering rate changing point is set at a temperature in a range of 80° to 100° C.

By virtue of the manufacturing method described above, the varistor voltage can be increased while ensuring the excellent V-I characteristic for the voltage-nonlinear resistance element.

For carrying out the method described above, oxygen concentration of the oxidizing atmosphere employed in the second firing step may preferably be so selected as to be at least 80%.

By employing the oxidizing atmosphere containing at least 80% of oxygen, as described above, there can be realized a nonlinear-voltage resistance element (or varistor element) having the varistor voltage increased significantly with a small flatness ratio over a substantially whole current range from large to small current region.

Further, oxygen concentration of the oxidizing atmosphere in the second firing step may preferably be so selected as to fall within a range of 21 to 30% during the temperature lowering phase from the maximum firing temperature to the temperature corresponding to changing point of the temperature lowering rate in the second firing step.

With the method described above, there can be manufactured a nonlinear voltage resistance element (or varistor element) having the varistor voltage increased significantly with a small flatness ratio over a substantially whole current range from large to small current region.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a view for illustrating sintering processes together with the atmosphere and the temperatures therefor in the resistance element manufacturing method according to first and second exemplary embodiments of the present invention;

FIG. 4 is a view for illustrating varistor voltages and flatness ratios of V-I characteristic curve in nonlinear-voltage resistance elements manufactured, being added with $Al_2O_3$ and rare-earth elements;

FIG. 6 is a view illustrating varistor voltages and flatness ratios in resistance elements subjected to gradual cooling in a temperature lowering process in an oxidizing atmosphere in a second firing step;

FIG. 7 is a view illustrating relations between the varistor voltage and the V-I characteristic flatness ratio of resistance element as manufactured and concentration of oxygen in an oxidizing atmosphere employed in a second firing step of the sintering process;

FIG. 8 is a view for illustrating firing patterns in the second firing step of the sintering process;

FIG. 9 is a view showing varistor voltages and V-I characteristic flatness ratios of resistance elements manufactured by firing in accordance with firing patterns shown in FIG. 8;

DESCRIPTION OF THE PREFERRED EMBODIMENTS

In General

Figure 2:
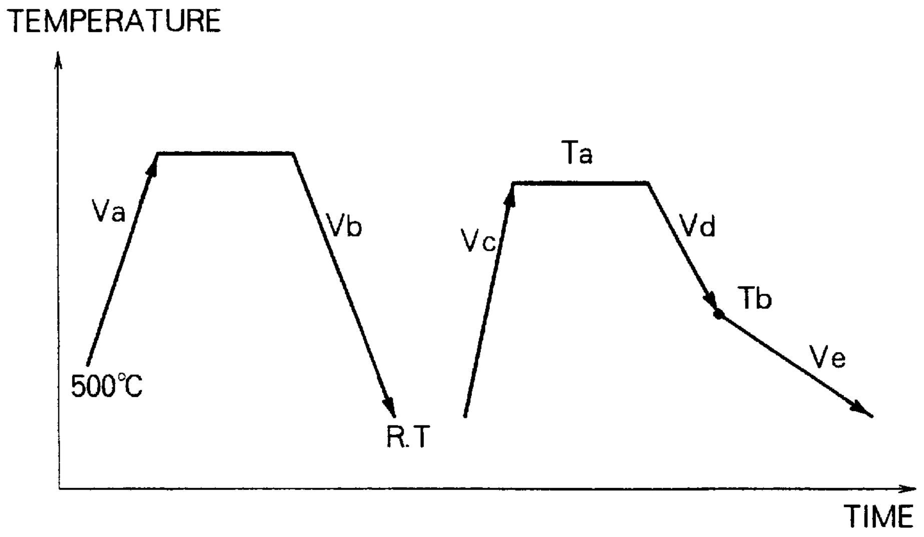
FIG. 2 is a view for illustrating a pattern of firing temperature adopted in the sintering process.

At first, the basic concept underlying the present invention will be described. In general, the resistance element exhibiting the nonlinear voltage characteristic is formed by shaping a mixture containing as a primary component zinc oxide and additives of metals or compounds and by sintering a preform thus formed at a high temperature in an oxidizing atmosphere.

With a view to improving the nonlinear voltage characteristic of the resistance element, enhancing durability or withstanding capabilities, extending the use life and realizing other desirable properties of the resistance element, the composition of the raw material or starting mixture should preferably be prepared such that the content of zinc oxide or oxides is of 90 to 97 mol % and more preferably in a range of 92 to 96 mol % in terms of ZnO.

Usually, bismuth oxide having a grain size of 1 to 5 $\mu$m is used as an additive. In that case, content of bismuth oxide or oxides in the starting composition should preferably be so selected as to be of 0.1 to 5 mol % and more preferably 0.2 to 2 mol % in terms of $Bi_2O_3$ in view of the fact that the content of bismuth oxide or oxides higher than 5 mol % exerts adverse influence to the effect of suppressing the grain growth of zinc oxide owing to the addition of rare-earth element or elements and that the contents of bismuth oxide or oxides less than 0.1 mol % tends to increase the leakage current.

Antimony oxide having a grain size in a range of 0.5 to 5 $\mu$m is used as an additive. In this conjunction, it is to be mentioned that antimony oxide(s) contributes to increasing the varistor voltage of the resistance element exhibiting the voltage nonlinearity characteristic. When the content of antimony oxide or oxides exceeds 5 mol %, there will exist in the resistance element as manufactured lots of the spinel grains (serving for insulation) which are reaction products of antimony oxide(s) and zinc oxide(s), as a result of which limitation imposed to current flow paths becomes remarkable although the varistor voltage can be increased. This in turn means that impulse withstanding capability or energy accommodating capability of the resistance element is degraded, giving rise to a problem that the resistance element is likely to suffer destruction. On the other hand, when the content of antimony oxide(s) is less than 0.5 mol %, the suppression effect of the grain growth of zinc oxide(s) can not be achieved sufficiently. For these reasons, composition of the raw or starting material or mixture should be so prepared that the content of antimony oxide(s) lies within a range of 0.5 to 5 mol % and more preferably in a range of 0.75 to 2 mol % in terms of $Sb_2O_3$.

Furthermore, with a view to improving the voltage nonlinearity of the resistance element, the starting material on composition is added with chromium oxide(s), nickel oxide (s), cobalt oxide(s), manganese oxide(s) and silicon oxide (s). In this conjunction, it is desirable that each of these oxides should have grain size not greater than 10 $\mu$m on an average. The contents of these components in the starting or raw material should preferably be so selected as to be greater than 0.1 mol % and more preferably greater than 0.2 mol % inclusive, in terms of $Cr_2O_4$, NiO, $Co_3O_4$, $Mn_3O_4$ and $SiO_2$, respectively. However, when each of the contents of these components exceed 5 mol %, then proportions of the spinel phase, pyrochrore phase (intermediate reaction product making appearance in the spinel producing reaction) and zinc silicate increase, which tends to involve lowering of the energy accommodating (or impulse withstanding) capability as well as deterioration of the voltage nonlinearity because the current flow paths will then be bent complicatively, as described hereinbefore in conjunction with the addition of antimony oxide(s) ($Sb_2O_3$). Thus, composition of the raw material should preferably be so adjusted that the contents of chromium oxide(s), nickel oxide(s), cobalt oxide(s), manganese oxide(s) and silicon oxide(s) are smaller than 3 mol % and more preferably less than 2 mol % in terms of $Cr_2O_4$, NiO, $Co_3O_4$, $Mn_3O_4$ and $SiO_2$, respectively.

Additionally, in order to decrease effectively pores possibly existing between the zinc oxide grains by increasing fluidity of bismuth oxide(s) in a high temperature sintering process by lowering a melting point thereof while improving the voltage nonlinearity by reducing resistance presented by the zinc oxide grains, the raw or starting mixture should contain 0.0005 to 0.005 mol % of aluminum in terms of $Al_2O_3$ and 0.001 to 0.1 mol % of boron oxide(s) in terms of $B_2O_3$.

Besides, in order to improve the voltage nonlinearity by enhancing the flatness of the V-I (voltage-versus-current) characteristic curve of the resistance element in the large current region while increasing the varistor voltage thereof, the starting composition should contain at least one of rare-earth elements (represented collectively by R) at a ratio of 0.01 to 3 mol % in total in terms of oxide given by $R_2O_3$. Oxides of these rare-earth elements (R) should preferably have a size usually less than 5 μm on an average.

Next, description will be directed to a method of manufacturing the resistance element of voltage-nonlinear characteristic.

After adjusting appropriately the grain sizes on an average of the components of the starting mixture by means of a ball mill or the like, a slurry of the mixture is formed by adding, for example, an aqueous solution of polyvinyl alcohol, an aqueous solution of such as, for example, boracic acid or the like which is formed by resolving a trace additive of boron oxide into water, dried by using a spray drier or the like and then granulated.

The granulated mixture material thus obtained is then pressurized in uniaxial direction under a pressure, for example, of 200 to 500 kgf/cm$^2$, to thereby form a preform having a predetermined shape. The preform then undergoes a preheating at a temperature on the order of 600° C. in order to remove the binder agent (such as polyvinyl alcohol). Thereafter, the preform is subjected to a sintering process.

Sintering in a first step is performed in the atmosphere of air at least at a highest temperature which falls within a range of 1000° to 1300° C. and more preferably 1100° to 1270° C. for 1 to 20 hours and more preferably for 3 to 10 hours In order to promote fluidization of bismuth oxide(s) which constitutes; primary grain-boundary components existing between the zinc oxide grains while reducing effectively the pores existing between the grains, the temperature increasing or rising rate in the sintering process is set to be lower than 30° C./hr and preferably lower than 25° C./hr within the melting temperature range of bismuth oxide(s) which is generally higher than 500° C.

In a second firing step, it is preferred to perform the sintering in an oxidizing atmosphere which has at least an oxygen partial pressure higher than 80% by volume. Because a sintered product of a high density with the pores being reduced significantly can be obtained in the first firing step, it is contemplated with the second firing step to supply a sufficient amount of oxygen to the grain boundary regions among the zinc oxide grains. To this end, it is desirable to rise the temperature at a rate of 50° to 200° C./hr, while in the temperature-lowering process, the lowering rate should be so controlled as to be at a rate of 50° to 200° C./hr in an earlier half and at a rate not exceeding 50° C./hr in a latter half with reference to a temperature range (500° to 800° C.) around a crystallization temperature of bismuth oxides.

The conditions mentioned above are required to obtain a sintered product exhibiting highly excellent characteristics by allowing a solid phase reaction to take place sufficiently with sintering reaction being adequately promoted. In this conjunction, it is noted that the crystallization temperature range of bismuth oxide(s), starting from which the temperature lowering rate is caused to change, tends to vary finely or subtly in dependence on the composition. Accordingly, the temperature setting to this end should be performed by resorting to the use of a suitable tool, e.g. with the aid of a TMA (ThermoMechanical Analysis) apparatus or the like.

Now, the present invention will be described in detail in conjunction with what is presently considered as preferred or typical embodiments thereof by reference to the drawings, being understood, however, that the invention is never restricted to them but can be carried in other various modes conceivable for those skilled in the art.

Exemplary Embodiment 1

A starting composition or mixture is prepared such that the contents of bismuth oxide, chromium oxide, nickel oxide, cobalt oxide, manganese oxide and silicon oxide are each of 0.5 mol %, and that of antimony oxide is 1.2 mol % with aluminum oxide being contained in 0.002 mol % in terms of $Al_2O_3$ while boron oxide, which is a trace amount of additive, is contained in 0.04 mol %, respectively. Starting from the basic composition mentioned above, specimens 1 to 16 enumerated in the following table 1 are prepared by adding rare-earth elements, i.e., yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu) (which will be generally represented by "R") each in 0.5 mol % in terms of $R_2O_3$ (where R designates representatively each of the rare-earth elements mentioned above). The remaining part of the content is that of zinc oxide (ZnO).

TABLE 1

| SPECIMEN ID NO. | 1 | 2 | 3 | 4 | 5 | 6 | 7 | 8 |
|---|---|---|---|---|---|---|---|---|
| RARE-EARTH ELEMENT | NONE | Y | La | Ce | Pr | Nd | Sm | Eu |
| SPECIMEN ID NO. | 9 | 10 | 11 | 12 | 13 | 14 | 15 | 16 |
| RARE-EARTH ELEMENT | Gd | Tb | Dy | Ho | Er | Tm | Yb | Lu |

Each of the starting materials prepared as mentioned above is mixed with an aqueous solution of polyvinyl alcohol serving as binder and an aqueous solution of such as, for example, boracic acid or the like which is formed by resolving a trace additive of boron oxide into water, by using a ball mill or disperse mill to thereby form a slurry, which is then dried by means of a spray drier and then granulated. The granulated material is shaped into a preform by applying a uniaxial pressure in a range of 200 to 500 kgf/cm$^2$. Parenthetically, each of the specimen preforms thus obtained has a nominal diameter (ϕ) of 125 mm and a thickness of 30 mm. The granulated preforms or specimens undergo preheating for five hours at a temperature of 600° C. to thereby remove the binder.

A sintering process is then carried out for the specimens mentioned above on the conditions indicated by a firing pattern No. 1 shown in FIG. 1 in two sintering or firing steps, wherein sintering or firing temperature is controlled in such a manner as illustrated graphically in FIG. 2. Referring to FIG. 2, reference character Va designates a temperature rising rate up to a maximum temperature from 500° C. in the first firing step, Vb designates a temperature lowering rate in the first firing step. Reference symbol Vc designates a temperature rising rate up to a maximum temperature in the second firing step, Ta designates the maximum temperature in the second firing step, Vd designates a temperature lowering rate from the maximum temperature Ta to a changing point of the temperature lowering rate in the second firing step. Further, Tb designates the changing point of the temperature lowering rate in the second firing step, and Ve designates a temperature lowering rate after passing through the changing point Tb in the second firing step.

Figure 3:
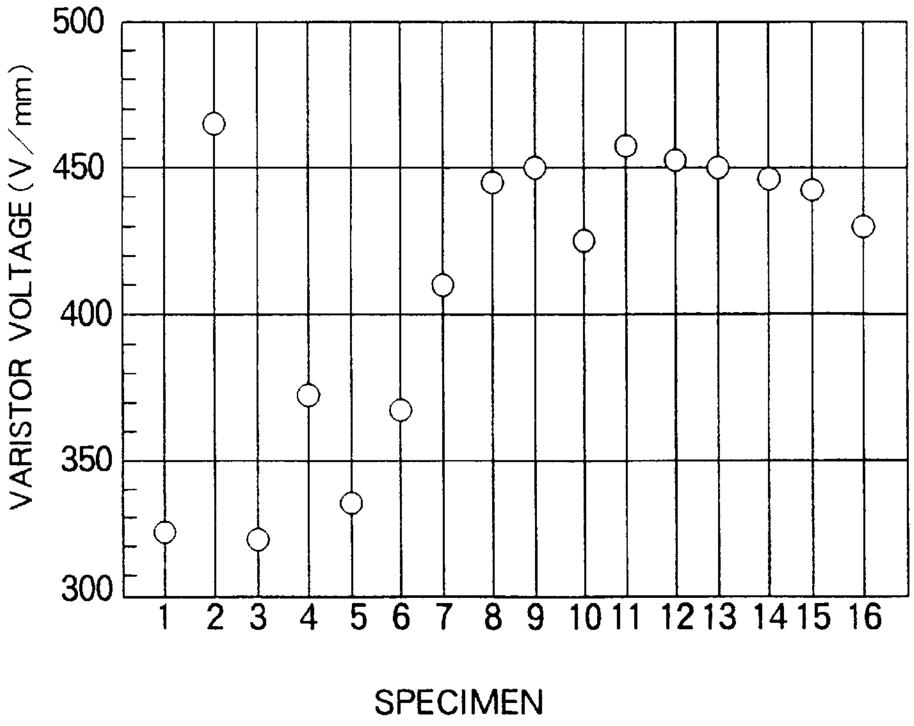
FIG. 3 is a view illustrating varistor voltages of resistance elements manufactured, being added with rare-earth elements.

After polishing and cleaning the elements as obtained, aluminum electrodes are attached to measure the varistor voltage, the results of which are illustrated in FIG. 3.

Let's compare the specimen No. 1 which contains no rare-earth element with the specimens Nos. 2 to 16. As can be seen from FIG. 3, the varistor voltage increases when rare-earth element is added. However, in the case of the specimens Nos. 3 and 5 which is added with lanthanum (La) and praseodymium (Pr), respectively, increasing of the varistor voltage is not significant. Accordingly, with a view to realizing the resistance element of nonlinear voltage characteristic which exhibits a large varistor voltage while suppressing dispersions of the electric characteristic among the specimens to a minimum, it is preferred from the practical viewpoint to exclude those rare-earth elements whose addition does not contribute to increasing the varistor voltage more than 10% of the highest varistor voltage which the specimen No. 2 exhibits. Consequently, rare-earth elements (R) to be added should preferably be limited to yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) which are used as the additives in the specimen No. 2 and the specimens Nos. 7 to 16, respectively.

Exemplary Embodiment 2

A starting composition or mixture is adjusted such that the contents of bismuth oxide, chromium oxide, nickel oxide, cobalt oxide, manganese oxide and silicon oxide are each of 0.5 mol %, and that of antimony oxide is 1.2 mol % while boron oxide, which is a trace additive, is contained in 0.04 mol %, respectively. Starting from the basic composition mentioned above, aluminum and rare-earth elements are added in the amounts illustrated in FIG. 4 in terms of $Al_2O_3$ and $R_2O_3$, respectively. The remaining part is zinc oxide (ZnO).

Each of the starting materials prepared as mentioned above is mixed with an aqueous solution of polyvinyl alcohol serving as a binder and an aqueous solution of such as, for example, boracic acid or the like which is formed by resolving a trace additive of boron oxide into water, by using a ball mill or disperse mill to thereby form a slurry, which is then dried by means of a spray drier and granulated subsequently. The granulated material is shaped into a preform by applying a uniaxial pressure in a range of 200 to 500 kgf/cm$^2$. Parenthetically, each of the specimen preforms thus obtained has a nominal diameter (ϕ) of 125 mm and a thickness of 30 mm. The granulated preforms or specimens undergo preheating for five hours at a temperature of 600° C. to thereby remove the binder.

A sintering process is carried out for the specimens on the conditions indicated by a firing pattern No. 1 shown in FIG. 1 in two firing steps, wherein sintering temperature is controlled in such a manner as illustrated graphically in FIG. 2. After polishing and cleaning the elements as obtained, aluminum electrodes are attached to measure the varistor voltage ($V_{1mA}$/mm), the results of which are illustrated in FIG. 4. In FIG. 4, all the measurement values represent the means values for all the specimens added with eleven different rare-earth elements.

Figure 5:
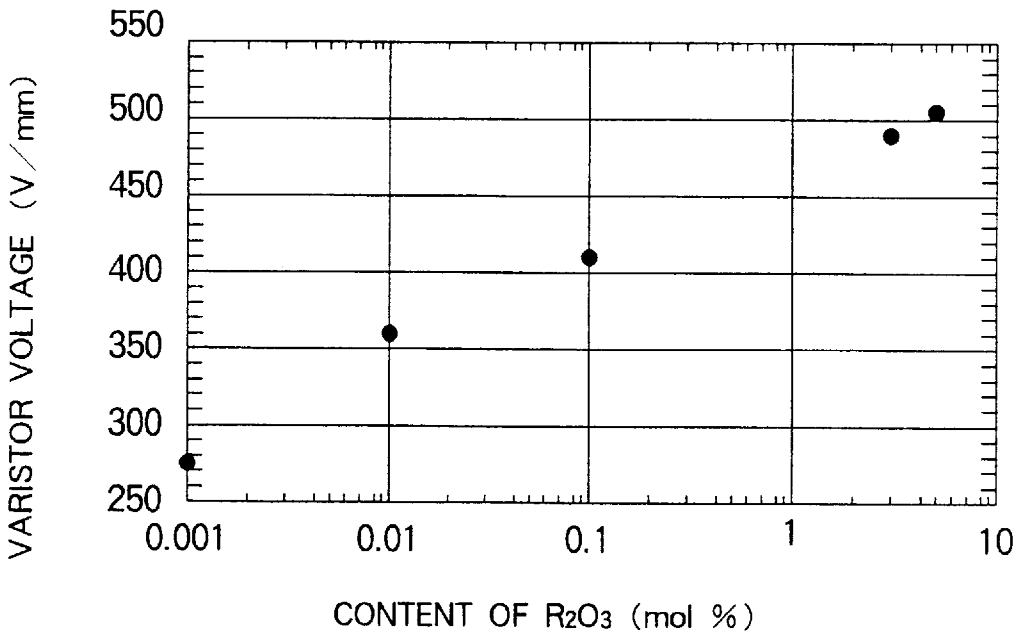
FIG. 5 is a view showing a relation between amounts of addition of rare-earth elements and varistor voltage.
Figure 10:
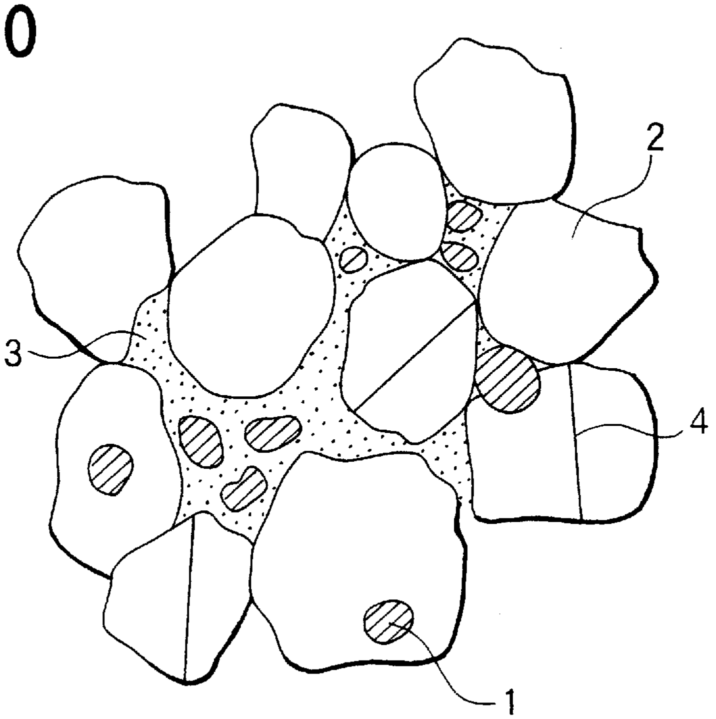
FIG. 10 is a schematic diagram showing a structure of a voltage-nonlinear resistance element made of a sintered material and known heretofore.
Figure 11:
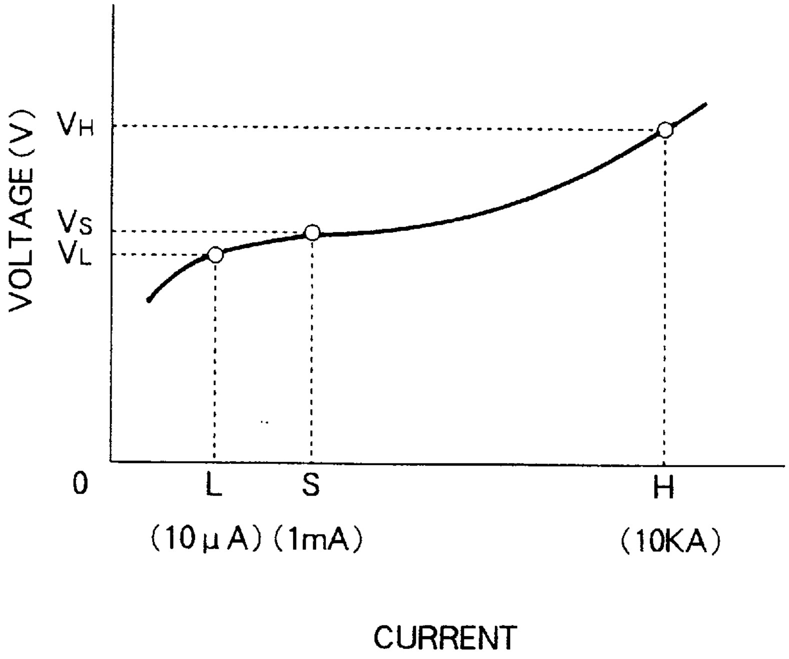
FIG. 11 is a view for illustrating a voltage-versus-current (V-I) characteristic of the same.

Comparison of the specimens Nos. 17 to 22 shows that the varistor voltage becomes higher as the amount of addition of rare-earth element increases, as can be seen from FIG. 5. The specimen No. 17 containing none of rare-earth element corresponds to the conventional resistance element known heretofore. The specimen No. 18 added with 0.001 mol % of rare-earth element certainly shows that the varistor voltage is increased, the extent of which is however only to be negligible. By contrast, in the case of the specimens Nos. 19 to 22, the mean values of the varistor voltage are all higher than 350 V/mm, indicating improvement by 50 to 100% when compared with that of the conventional resistance element. On the other hand, in the case of the specimen No. 22, the varistor voltage certainly assumes a high value. However, the flatness ratio of the V-I characteristic curve in the small current region is degraded more than 10% when compared with that of the specimen No. 17. Thus, it is safe to say that the resistance element corresponding to the specimen No. 22 should be excluded from practical use because of possibility of intolerably high leakage current. For the reasons mentioned above, the optimal amount of addition of rare-earth element should preferably be so selected as to fall within a range of 0.01 to 3 mol % in terms of the $R_2O_3$.

Further, comparison of the specimens Nos. 23 to 27 shows that the flatness ratio of the V-I characteristic curve decreases in the small current region as the amount of aluminum (Al) as added is decreased while the flatness ratio increases in the large current region of the V-I characteristic curve in proportion to the amount of aluminum. However, when compared with the specimen No. 17, the flatness ratio of the V-I characteristic curve in the large current region degrades more than 10% in the case of the specimen No. 23, while the flatness ratio in the small current region degrades more than 10% in the case of the specimen No. 27. For the reasons mentioned above, the optimal amount of addition of aluminum should preferably be so selected as to fall within a range of 0.0005 to 0.005 mol % in terms of $Al_2O_3$.

As is apparent from the foregoing, according to the teachings of the present invention incarnated in the first and second exemplary embodiments, there can be obtained an electric resistance element of nonlinear voltage characteristic having a varistor voltage increased by 50 to 100% as compared with the conventional resistance element while ensuring the current flatness ratio of the nonlinear voltage characteristic equivalent to that of the conventional element over the whole current region, by virtue of the composition of the resistance material which contains zinc oxide as a primary component and containing bismuth oxide, chromium oxide, nickel oxide, cobalt oxide, manganese oxide, silicon oxide and boron oxide and added with at least one of rare-earth elements including yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) each in a range of 0.001 to 3.0 mol % in terms of $R_2O_3$ where R represents generally rare-earth elements and containing aluminum (Al) in a range of 0.0005 to 0.005 mol % in terms of $Al_2O_3$.

Exemplary Embodiment 3

A starting composition or mixture is prepared such that the contents of bismuth oxide, chromium oxide, nickel oxide, cobalt oxide, manganese oxide and silicon oxide are each of 0.5 mol %, that of antimony oxide is 1.2 mol %, with that of aluminum, a trace additive, being contained in 0.002 mol %, while boron oxide is contained in 0.04 mol %. Starting from the basic composition mentioned above, rare-earth elements, i.e., yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) (collectively represented by “R”) are added in 0.1 mol % in terms of oxides ($R_2O_3$) of rare-earth elements, respectively. The remaining part is the content of zinc oxide (ZnO).

Each of the starting materials prepared as mentioned above is mixed with an aqueous solution of polyvinyl alcohol serving as a binder and an aqueous solution of such as, for example, boracic acid or the like which is formed by resolving a trace additive of boron oxide into water, by using a ball mill or disperse mill to thereby form a slurry, which is then dried by means of a spray drier and then granulated. The granulated material is shaped into a preform by applying a uniaxial pressure in a range of 200 to 500 kgf/cm$^2$. Parenthetically, each of the specimen preforms thus obtained has a nominal diameter ($\phi$) of 125 mm and a thickness of 30 mm. The granulated preforms or specimens undergo preheating for five hours at a temperature of 600° C. to thereby remove the binder.

A second firing step is carried out on the conditions indicated by a firing pattern No. 1 shown in FIG. 1 in two sintering or firing steps, wherein the firing temperature is controlled in such a manner as illustrated graphically in FIG. 2. After polishing and cleaning the elements as obtained, aluminum electrodes are attached to measure the varistor voltage ($V_{1mA}$/mm) and the flatness ratio of the V-I characteristic, the results of which are illustrated in FIG. 6. In FIG. 6, all the measurement values represent the means values for all the specimens added with eleven different rare-earth elements.

As can be seen from FIG. 6, when the temperature rising rate in the first firing step carried out in the atmosphere of air is higher than 100° C./hr, the sintering reaction internally of the preform is accompanied with a lag as compared with the sintering reaction in the vicinity of the outer surface in the case where the resistance element of the dimensions mentioned above is to be manufactured. Consequently, cracking will take place in most of the resistance elements as manufactured. For this reason, the temperature rising rate in the first firing step should be as low as possible in order to ensure uniformization of the sintering reaction throughout resistance element on the whole.

Additionally, comparison of the specimens Nos. 28, 30 and 31 shows that although the temperature-lowering rate in the first firing step carried out in the atmosphere of air contributes to improvement more or less of the flatness ratio in the large current region of the V-I characteristic curve, the temperature-lowering rate is not a factor affecting remarkably the V-I characteristic of the resistance element. Accordingly, the temperature-lowering rate now under discussion should be as high as possible so long as the manufacturing conditions allow, in consideration of the firing in the second step.

Additionally, comparison of the specimens Nos. 28, 32 and 33 shows that any appreciable variation can not be observed in the flatness ratio of the V-I characteristic curve in the second firing step at the temperature rising rate range of 50° to 200° C./hr within the oxidizing atmosphere (e.g. at the oxygen partial pressure of 100% by volume in the case of the instant example). The temperature rising rate higher than 500° C./hr brings about cracking in the resistance element as manufactured. Thus, in view of the manufacturing efficiency as well as from the economical standpoint, the temperature rising rate should preferably be selected to be lower than 500° C./hr and more preferably in a range of 50° to 200° C./hr because the first firing step has been completed.

Further, comparison of the specimens Nos. 28, 38 and 39 shows that when the maximum temperature in the second firing step is higher than that in the first firing step, the flatness ratio of the V-I characteristic in the small current region can remarkably be improved. However, in that case, the porosity is increased, giving rise to a problem that moisture absorbing capability is degraded. On the other hand, when the maximum firing temperature in the second firing step is lower than the maximum temperature (1300° C.) in the first firing step by 300° C. or more, the flatness ratio of the V-I characteristic curve is degraded, rendering the intended effect of the second firing step ineffective. Accordingly, the maximum temperature in the second firing step should be set equal to that of the first firing step or at a temperature within a range lower than that of the first firing step by 300° C. at the most.

Furthermore, comparison of the specimens Nos. 28, 34 and 40 shows that the temperature-lowering rate from the maximum point to the changing point (or trasition point) of the temperature-lowering rate in the second firing step contributes to reducing the flatness ratio of the V-I characteristic curve in the large current region as the temperature-lowering rate is higher. However, when the temperature-lowering rate exceeds the rate of 200° C./hr, the flatness ratio of the V-I characteristic curve is degraded in the small current region. Such being the circumstances, the temperature-lowering rate down to the temperature-lowering rate changing point should be set in a range of 50° to 200° C./hr and more preferably within a range of 50° C./hr to 100° C./hr.

The temperature-lowering rate changing point in the second firing step plays a very important role in carrying out the present invention. More specifically, for the purpose of reducing oxygen defect of zinc oxide grains and supply oxygen in excess to the inter-grain boundaries of zinc oxide during the temperature-lowering process, the temperature-lowering rate is changed within a range around the crystallization temperature of bismuth oxide which is good conductor for oxygen ions. Comparison of the specimen Nos. 28, 35 and 42 with one another shows that when the point at which the temperature-lowering rate is changed in the second firing step is set lower, the flatness ratio of the V-I curve in the small current region becomes degraded, causing the aimed effects of the two-step sintering process to disappear. On the other hand, even when the changing of the temperature-lowering rate is set high, any significant change can scarcely be observed. Since the flatness ratio of the V-I characteristic curve in the small current region can not be improved unless the temperature-lowering rate following the changing point mentioned above is made lower than that preceding to the changing point, the changing point of concern should preferably be set at a temperature as low as possible within a range where the aimed effect can be realized, from the standpoint of manufacturing efficiency or productivity. More specifically, changing point of the temperature-lowering rate in the second firing step should preferably be set in a temperature range of 450° to 900° C. and more preferably in a range of 500° to 800° C. although it depends on the composition of the starting material as well as the conditions for the sintering process. In this conjunction, setting of the changing point of the temperature-lowering rate should be performed with the aid of an appropriate tool such as a TMA (ThermoMechanical Analysis apparatus) or the like in consideration of the fact that crystallization temperature of bismuth oxide varies delicately or subtly in dependence on the composition.

It should further be noted that as can be seen from comparison of the specimens Nos. 28, 36 and 43, the flatness ratio of the V-I characteristic curve becomes smaller as the temperature-lowering rate following the changing point thereof is decreased in the second firing step. At the temperature-lowering rate of 100° C./hr, the V-I characteristic of the resistance element as manufactured becomes degraded. Accordingly, the temperature-lowering rate after the changing point thereof should be set preferably at 50° C./hr at highest and more preferably at 30° C./hr or less.

As is apparent from the foregoing, according to the teachings of the present invention incarnated in the third exemplary embodiment, with the composition of the resistance material containing zinc oxide as a primary component and containing bismuth oxide, chromium oxide, nickel oxide, cobalt oxide, manganese oxide, silicon oxide and boron oxide and added with rare-earth elements including yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) collectively represented by "R" each in 0.001 to 3.0 mol % in terms of $R_2O_3$ while containing aluminum (Al) in 0.0005 to 0.005 mol % in terms of $Al_2\mathbf{0}_3$, the varistor voltage of the resistance element as manufactured can be increased by 50 to 100% or more. Furthermore, by virtue of the two-step sintering process in which the sintering or firing is performed in the air in the first step which is followed by the second step of sintering or firing in the oxidizing atmosphere, the sintered material undergone the sintering reaction to an appropriate extent in the air-atmosphere in the first firing step is progressively cooled in the temperature-lowering process while undergoing the firing process in the oxidizing atmosphere in the second firing step, whereby a sufficient amount of oxygen is supplied to the inter-grain boundaries between the zinc-oxide crystal grains. Thus, there can be obtained a voltage-nonlinear resistance element which is excellent in the flatness ratio of the V-I characteristic.

Exemplary Embodiment 4

A starting composition or mixture is prepared such that the contents of bismuth oxide, chromium oxide, nickel oxide, cobalt oxide, manganese oxide and silicon oxide are each of 0.5 mol %, and that of antimony oxide is 1.2 mol % with boron oxide, which is a trace amount of additive, is contained in 0.04 mol %. Starting from the basic composition mentioned above, aluminum and rare-earth elements, i.e., yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) (collectively represented by "R") are added in the amounts illustrated in FIG. 7 in terms of $A_2O_3$ and $R_2O_3$, respectively. The remaining part is the content of zinc oxide (ZnO).

Each of the starting materials prepared as mentioned above is mixed with an aqueous solution of polyvinyl alcohol serving as binder and an aqueous solution of such as, for example, boracic acid or the like which is formed by resolving a trace additive of boron oxide into water, by using a disperse mill to thereby form a slurry, which is then dried by means of a spray drier and granulated subsequently. The granulated material is shaped into a preform by applying a uniaxial pressure in a range of 200 to 500 kgf/cm$^2$. Parenthetically, each of the specimen preforms thus obtained has a nominal diameter (ϕ) of 125 mm and a thickness of 30 mm. The granulated preforms or specimens undergo preheating for five hours at a temperature of 600° C. to thereby remove the binder.

The first firing step (at 1,150° C.×5 hr) of the two-step sintering process is carried out in accordance with a sintering or firing pattern No. 1 shown in FIG. 1 (i.e., in the atmosphere of air with Va=30° C./hr and Vb=50° C./hr). Parenthetically, oxygen concentrations of the oxidizing atmosphere employed in the second sintering or firing step are shown in FIG. 7.

After polishing and cleaning the elements as obtained, aluminum electrodes are attached to measure the electric characteristics, the results of which are illustrated in FIG. 7. In FIG. 7, the values of the flatness ratio enumerated in the table represent the flatness ratio ($V_{10KA}/V_{10microA}$) over the whole region inclusive of the large current region and the small current region, all the measurement values representing the means values for all the specimens added with oxides of eleven different rare-earth elements. These results show the facts which will be described below.

As can be seen from comparison of the specimens Nos. 44 to 58, the flatness ratio substantially comparable to that obtained by the firing process carried in the oxidizing atmosphere containing oxygen at a concentration of 100% can be realized with the oxygen concentration of 80%. On the other hand, in the cases where the oxygen concentration is 60% or less, the flatness ratio becomes degraded in all the specimens. Thus, in order to supply a sufficient amount of oxygen to the inter-grain boundary regions between the zinc oxide grains by employing the oxidizing atmosphere in the second sintering or firing step, it is desirable to set the oxygen concentration at least at 80%. In that case, very excellent flatness ratio can be obtained.

As will now be understood from the above, according to the invention incarnated in the fourth exemplary embodiment, there can be obtained a voltage-nonlinear resistance element ensuring a large varistor voltage which has a small flatness ratio over the whole current region from a large current to a small current by setting the oxygen concentration of the oxidizing atmosphere at 80% or more in the second firing step.

Exemplary Embodiment 5

A starting composition or mixture is prepared such that the contents of bismuth oxide, chromium oxide, nickel oxide, cobalt oxide, manganese oxide and silicon oxide are each of 0.5 mol %, and that of antimony oxide is 1.2 mol % with a trace additive of boron oxide being contained in 0.04 mol %. Starting from the basic composition mentioned above, rare-earth elements, i.e., yttrium (Y), samarium (Sm), europium (Eu), gadolinium (Gd), terbium (Tb), dysprosium (Dy), holmium (Ho), erbium (Er), thulium (Tm), ytterbium (Yb) and lutetium (Lu) (collectively represented by "R") are added in 0.5 mol % in terms of oxides ($R_2O_3$) of rare-earth elements, respectively. The remaining part is the content of zinc oxide (ZnO).

Each of the starting materials prepared as mentioned above is mixed with an aqueous solution of polyvinyl alcohol serving as a binder and an aqueous solution of such as, for example, boracic acid or the like which is formed by resolving a trace additive of boron oxide into water, by using a disperse mill to form a slurry, which is then dried by means of a spray drier and then granulated. The granulated material is shaped into a preform by applying a uniaxial pressure in a range of 200 to 500 $kgf/cm^2$. Parenthetically, each of the specimen preforms thus obtained has a nominal diameter (ϕ) of 125 mm and a thickness of 30 mm. The granulated preforms or specimens undergo preheating for five hours at a temperature of 600° C. to thereby remove the binder.

The first sintering or firing step (at 1,150° C.×5 hr) of the two-step sintering process is carried out in accordance with the firing pattern No. 1 shown in FIG. 1. Thereafter, the second firing step is carried out in accordance with a firing pattern No. 1 shown in FIG. 8.

After polishing and cleaning the elements as obtained, aluminum electrodes are attached to measure the electric characteristics, the results of which are illustrated in FIG. 9. These results show the facts which will be described below.

As can be seen from comparisons of the data of the specimens Nos. 59 to 73, the flatness ratio of the resistance element becomes smaller, as the oxygen concentration of the firing atmosphere employed during the temperature-lowering period from the maximum temperature (Ta) to the changing point (Tb) of the temperature-lowering rate in the second firing process is lower. Substantially same tendency can be observed when the atmosphere (oxygen concentration) is changed from 100 to 80% and then to 30% during the whole second firing period. Such phenomenon may be explained by the fact that when the resistance material or composition is placed in the atmosphere lacking excessively in oxygen in the high-temperature phase of the firing or sintering process, lots of oxygen defects will take place in zinc oxide crystal grains which are primary component of the resistance element, involving thus low resistance value of the zinc oxide grains themselves. Accordingly, the oxygen concentration of the atmosphere employed in the second firing step from the maximum temperature to the changing point of the temperature-lowering rate should be set as low as possible. In practical applications, in consideration of the workability (i.e., process manipulatability), it is preferred to set the oxygen concentration of concern at a value equivalent to that of the ambient air (20%) or less.

As will now be understood from the above, according to the present invention incarnated in the fifth exemplary embodiment, by setting the oxygen concentration in the temperature-lowering phase of the second firing step from the maximum temperature to the changing point of the temperature- lowering rate at 30% or less, there can be obtained a voltage-nonlinear resistance element which can exhibit a large varistor voltage while ensuring a small flatness ratio over the whole region from the large current to the small current region, because lots of oxygen defects take place within the region containing zinc oxide as a primary component, to thereby lower the resistance of zinc oxide itself.

Many modifications and variations of the present invention are possible in the light of the above techniques. It is therefore to be understood that within the scope of the appended claims, the invention may be practiced otherwise than as specifically described.

What is claimed is:

1. A composition for an electric material, containing as a primary component zinc oxide and additionally containing bismuth oxide, antimony oxide, chromium oxide, nickel oxide, cobalt oxide, manganese oxide, silicon oxide and boron oxide, said composition further containing at least one of rare-earth elements in a range of 0.01 mol % to 3.0 mol % in terms of oxide thereof given by $R_2O_3$ where R is selected from the group consisting of samarium (Sm), europium (Eu), gadolinium (Gd), terbium (Tb), dysprosium (Dy), holmium (Ho), erbium (Er), thulium (Tm), ytterbium (Yb) and lutetium (Lu); and aluminum in a range of 0.0005 mol % to 0.005 mol % in terms of aluminum oxide given by $Al_2O_3$.

2. An electric resistance element exhibiting a nonlinear voltage characteristics, containing as a primary component zinc oxide and additionally containing bismuth oxide, antimony oxide, chromium oxide, nickel oxide, cobalt oxide, manganese oxide, silicon oxide and boron oxide, said resistance element further containing at least one varistor voltage enhancing rare-earth element in a range of 0.01 mol% to 3.0 mol % in terms of oxide thereof given by $R_2O_3$ where R is selected from the group consisting of samarium, europium, gadolinium, terbium, dysprosium, holmium, erbium, thulium, ytterbium and lutetium; and aluminum in a range of 0.0005 mol % to 0.005 mol % in terms of aluminum oxide given by $Al_2O_3$.

3. An electric resistance element exhibiting a nonlinear voltage characteristic according to claim 2, wherein contents of said bismuth oxide, chromium oxide, nickel oxide, cobalt oxide, manganese oxide and silicon oxide are each of 0.5 mol %, content of said antimony oxide is of 1.2 mol %, an d content of boron oxide is of 0.04 mol %.

4. A method of manufacturing the electric resistance element of claim 2, said method comprising:

a step of preparing a mixture of oxides and forming a preform of a predetermined shape;

a first firing step of firing said preform in the atmosphere of air by rising a firing temperature from 500° C. to a maximum temperature of a value in a range of 1000° to 1300° C. at a temperature-rising rate lower than 30° C./hr inclusive;

a second firing step carried out in succession to said first firing step for firing said preform in an oxidizing atmosphere, wherein a maximum firing temperature in said second firing step is set at a value falling within a range from 950° C. to said maximum firing temperature in said first firing step; and a step of lowering said firing temperature in said second firing step at a temperature-lowering rate which is changed from a higher temperature-lowering rate to a lower temperature-lowering rate at a predetermined point of changing of the temperature lowering;

wherein said higher temperature-lowering rate lies within a range of 50° to 200° C./hr while said lower temperature-lowering rate is smaller than 50° C./hr inclusive, and wherein said predetermined temperature-lowering rate changing point is set at a temperature in a range of 80° to 100° C.

5. A method of manufacturing an electric resistance element exhibiting a nonlinear voltage characteristic according to claim 4, wherein oxygen concentration of said oxidizing atmosphere employed in said second firing step is so selected as to be at least 80%.

6. A method of manufacturing an electric resistance element exhibiting a nonlinear voltage characteristic according to claim 4, wherein oxygen concentration of said oxidizing atmosphere in said second firing step is so selected as to fall within a range of 21 to 30% during the temperature-lowering phase from said maximum firing temperature to the temperature corresponding to the changing point of said temperature-lowering rate in said second firing step.

7. A method of manufacturing an electric resistance element exhibiting a nonlinear voltage characteristic according to claim 5, wherein oxygen concentration of said oxidizing atmosphere in said second firing step is selected to fall within a range of 21 to 30% during the temperature-lowering phase from said maximum firing temperature of said second firing step to the changing point of said temperature-lowering rate.

* * * * *